United States Patent [19]
Arnold et al.

[11] Patent Number: 5,175,837
[45] Date of Patent: Dec. 29, 1992

[54] SYNCHRONIZING AND PROCESSING OF MEMORY ACCESS OPERATIONS IN MULTIPROCESSOR SYSTEMS USING A DIRECTORY OF LOCK BITS

[75] Inventors: Scott Arnold, Sutton; James Kann, Framingham; Stephen J. DeLaHunt, Harvard; Tryggve Fossum, Northboro, all of Mass.

[73] Assignee: Digital Equipment Corporation, Maynard, Mass.

[21] Appl. No.: 306,541

[22] Filed: Feb. 3, 1989

[51] Int. Cl.[5] .................. G06F 12/00; G06F 13/18
[52] U.S. Cl. ..................... 395/425; 364/246.8; 364/969.2; 365/195
[58] Field of Search ........................ 365/195; 364/900 MS File, 200 MS File; 395/425

[56] References Cited

U.S. PATENT DOCUMENTS

| | | | |
|---|---|---|---|
| 3,949,379 | 4/1976 | Ball | 395/775 |
| 4,000,485 | 12/1976 | Barlow et al. | 364/200 |
| 4,392,200 | 7/1983 | Arulpragasam | 395/425 |
| 4,481,572 | 11/1984 | Ochsner | 395/325 |
| 4,500,958 | 2/1985 | Manton et al. | 395/425 |
| 4,513,367 | 4/1985 | Chan et al. | 364/200 |
| 4,543,626 | 9/1985 | Bean et al. | 395/200 |
| 4,587,609 | 5/1986 | Boudreau et al. | 364/200 |
| 4,648,065 | 3/1987 | Zenk et al. | 364/900 |
| 4,835,672 | 5/1989 | Zenk et al. | 364/200 |
| 4,937,733 | 6/1990 | Gillett, Jr. et al. | 364/200 |
| 4,949,239 | 8/1990 | Gillett, Jr. et al. | 364/200 |

FOREIGN PATENT DOCUMENTS 051745 5/1982 European Pat. Off.
061570 10/1982 European Pat. Off.

OTHER PUBLICATIONS

Smith, A. J., "Cache Memory Design: An Evolving Art", IEEE Spectrum Dec. 1987, pp. 40-44.
Fossum et al., "An Overview of the VAX 8600 System", Digital Technical Journal, No. 1, Aug. 1985, pp. 8-23.
Troiani et al., "The VAX 8600 I Box, A Pipelined Implementation of the VAX Architecture", Digital Technical Journal, No. 1, Aug. 1985, pp. 24-42.
Levy and Eckhouse, Jr., *Computer Programming and Architecture, The VAX-11*, Digital Equipment Corporation, 1980, pp. 263-276, 296-303, 351-368.
G. Desrochers, *Principles of Parallel and Multiprocessing*, Intertext Publications, Inc., McGraw-Hill Book Co., 1987, pp. 68-71.

*Primary Examiner*—Glenn Gossage
*Attorney, Agent, or Firm*—Arnold, White & Durkee

[57] ABSTRACT

All monitoring and control of locked memory access requests in a multiprocessing computer system is handled by a system control unit (SCU) which controls the parallel operation of a plurality of central processing units (CPUs) and I/O units relative to a common main memory. Locking granularity is defined at the level of individual cache blocks for the CPUs, and the cache blocks also represent the unit of memory allocation in the computer system. The SCU is provided with a lock directory defined by a plurality of lock bits so that addresses in the same block of memory are mapped to the same location in the lock directory. Incoming lock requests for a given memory location are processed by interrogating the corresponding lock bit in the lock directory in the SCU by using the associated memory address as an index into the directory. If the lock bit is not set, the lock request is granted. The lock bit is subsequently set and maintained in that state until the unit requesting the lock has completed its memory access operation and sends an "unlock" request. If the interrogated lock bit is found to be set, the lock request is denied and the requesting port is notified of the denial. Fairness for the processing of denied lock requests is insured by a reserve list onto which denied requests are sequentially positioned on a first-come-first-served basis.

8 Claims, 6 Drawing Sheets

SYNCHRONIZING AND PROCESSING OF MEMORY ACCESS OPERATIONS IN MULTIPROCESSOR SYSTEMS USING A DIRECTORY OF LOCK BITS

RELATED APPLICATIONS

The present application discloses certain aspects of a computing system that is further described in the following U.S. patent applications filed concurrently with the present application: Arnold et al., METHOD AND APPARATUS FOR INTERFACING A SYSTEM CONTROL UNIT FOR A MULTIPROCESSOR SYSTEM WITH THE CENTRAL PROCESSING UNITS, Ser. No. 07/306,837 filed Feb. 3, 1989, abandoned, continued in Ser. No. 07/833,806 filed Feb. 10, 1992; Gagliardo et al., METHOD AND MEANS FOR INTERFACING A SYSTEM CONTROL UNIT FOR A MULTI-PROCESSOR SYSTEM WITH THE SYSTEM MAIN MEMORY, Ser. No. 07/306,326 filed Feb. 3, 1989, abandoned, continued in Ser. No. 07/646,522 filed Jan. 28, 1991; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989; Hetherington et al., METHOD AND APPARATUS FOR CONTROLLING THE CONVERSION OF VIRTUAL TO PHYSICAL MEMORY ADDRESSES IN A DIGITAL COMPUTER SYSTEM, Ser. No. 07/306,544 filed Feb. 3, 1989, now abandoned, and continued in Ser. No. 07/746,007 filed Aug. 9, 1991; Chinnasway et al., MODULAR CROSSBAR INTERCONNECTION NETWORK FOR DATA TRANSACTIONS BETWEEN SYSTEM UNITS IN A MULTI-PROCESSOR SYSTEM, Ser. No. 07/306,336 filed Feb. 3, 1989, and issued as U.S. Pat. No. 4,968,977 on Nov. 6, 1990; Gagliardo et al., MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY, Ser. No. 07/306,404 filed Feb. 3, 1989 and issued as U.S. Pat. No. 5,043,874 on Aug. 27, 1991; Flynn et al., SCHEME FOR INSURING DATA CONSISTENCY BETWEEN A PLURALITY OF CACHE MEMORIES AND THE MAIN MEMORY IN A MULTI-PROCESSOR COMPUTER SYSTEM, Ser. No. 07/306,776 filed Feb. 3, 1989, abandoned, continued in Ser. No. 07/727,296 filed Jul. 9, 1991, and Hetherington et al., METHOD AND APPARATUS FOR ORDERING AND QUEUING MULTIPLE MEMORY REQUESTS, U.S. Ser. No. 07/306,870 filed Feb. 3, 1990.

TECHNICAL FIELD

This invention relates generally to multiprocessor computer systems. More particularly, this invention relates to the synchronizing and processing of memory access operations in such a computer system where multiple processor units and input/output units share data structures in the common system memory.

DESCRIPTION OF THE RELATED ART

In high-performance multiprocessor computer systems, a plurality of central processor units (CPUs) are typically operated in a parallel fashion in conjunction with other system units, including several input/output (I/O) units, by providing all system units with relatively autonomous accessibility to a common system memory (the primary or main memory). These system units are capable of both reading from and writing to locations within the main memory. Because the system units share data structures in main memory and because memory access requests originating from these units are asynchronous in nature, memory access conflicts arise when access to identical locations in memory is requested by different system units at the same time. Accordingly, it is imperative to control access to main memory in such a manner that memory access requests are sequenced correctly so as to avoid access conflicts. Memory interlocks are commonly used for this purpose.

Memory interlocks are mechanisms implemented in hardware or software to coordinate the activity of two or more memory access operations (initiated by a system unit, such as a CPU or I/O unit) and generally insure that one process has reached a suitable state such that the other may proceed. Because the conflicting access operations use common memory resources, interlocks will sequence the requests to guarantee that one request is honored at a time, and perhaps that some discipline, such as first-come-first-served, is observed.

In particular, when a system unit, such as a CPU, performs an interlocked read to memory, no other unit is allowed interlocked access to the same location until the first processor does a write unlock to release the lock. This type of sequencing allows controlled sharing of data structures without giving rise to "race" conditions which would otherwise occur if interdependent memory access operations were to be executed without proper sequencing. Interlock mechanisms are physically implemented within the memory system by designating interlock bits associated with memory locations that need to be locked. Thus, when a CPU needs to read or write to a memory location while precluding the possibility of having the contents of that location affected by being accessed by another CPU or I/O unit, the CPU performs a 'locked' access to the desired location. This access causes a corresponding lock bit to be set. Any other memory access operation addressed to the 'locked' location involves the initial testing of the corresponding lock bit. If the bit is found to be set, i.e., the requested memory location has been 'locked', the access request is denied. Once the access request which initiated a lock has been completed, the lock bit is reset or 'unlocked' and a subsequent memory access request addressing the previously locked memory location is allowed to go through.

Since the use of interlock bits is restricted to synchronizing problems only, which occur infrequently and only when locked access is requested to the same memory locations, it becomes highly impractical to provide a single lock bit for each location in main memory. Conventional high speed systems have tackled this problem by providing only a single lock bit for the whole memory system. Under this arrangement, when a CPU makes a locked read or write to even a single memory location, the complete system memory is locked up to subsequent lock requests. The single lock bit systems performed adequately since the number of interlock requests was relatively low so that request synchronization was infrequently called for. Under such conditions, a considerably less dense allocation of lock bits was found to be satisfactory.

However, as the operational speed for CPUs increased, as larger memories became typical, and as multiprocessing, using shared memory resources, and parallel processing, by problem decomposition, became increasingly popular, the average number of interlock requests has increased dramatically to the point where it is essential to have a locking granularity which is considerably less than that of the overall memory system. Single lock bit systems are no longer capable of efficiently sequencing memory access requests which frequently are interlocked in nature.

A further consideration in the use of interlock bits is the physical location in which they are to be stored. It may appear to be convenient to allocate a section of main memory for storing the interlock bits since all memory access requests ultimately do reach the main memory. There are, however, a number of disadvantages inherent to such a scheme. By storing the interlock bits in the main memory, a substantial portion of the main memory becomes dedicated to this function only and cannot be used for other important purposes.

More significantly, checking the interlock bits when they are stored in the main memory would be a very slow process. Main memory, because of its great size, is ordinarily constructed from low-speed, low-cost memory components so as to reduce the overall computer system cost. In order to prevent the main memory from slowing down the overall operation of the computer system, high-speed caches are employed in each of the CPUs. These caches contain selected portions of the main memory so that the CPU can normally access the desired data without accessing the main memory. If the interlock bits are stored in the main memory, then each CPU request for data must be preceded by a main memory access to interrogate the interlock bit, irrespective of whether the data is present in the high-speed cache or in the main memory.

An alternative is to store the interlock bits in the CPU caches in an attempt to solve the speed problems inherent in storing the interlock bits in the main memory. However, this approach is also equally problematic primarily because memory access functions that originate in the I/O units are not stored in the CPU caches and the I/O units, which are relatively slow and have no caches of their own, account for a large percentage of all locked memory access requests. Thus, it would be impractical to employ the high-speed CPU caches for storing interlock bits; problems associated with potential main memory access conflicts between CPUs and I/O units would still remain unsolved.

The present invention is directed to overcoming one or more of the above-referenced problems.

SUMMARY OF THE INVENTION

Briefly, in accordance with this invention, an efficient synchronizing scheme is provided for processing 'locked' memory access requests from various system units in a multi-processing system. The processing is handled in such a manner that requests are processed according to a locking granularity substantially less than that of the overall system memory while, at the same time, ensuring that the multiple requests are granted fair and quick access to desired locations in shared memory.

According to a feature of this invention, the monitoring and control of all lock requests is handled by a system control unit (SCU). This is in view of the fact that all transactions to and from memory are processed through the SCU in a multi-processing system of the type where the SCU controls the parallel operation of a plurality of CPUs and I/O units relative to the common main memory of the system. Locking granularity is defined at the level of individual cache blocks for the system CPUs and, accordingly, represents a granularity which is orders of magnitude less than that of the complete system memory, as used in conventional systems. The arrangement is advantageous in that the cache block also represents the unit of memory allocation in the illustrative system and particularly because the SCU, by virtue of its involvement with all transfers of memory blocks, is in a position to conveniently check if a block is locked or not.

Furthermore, the crippling disadvantages discussed above that would accompany storage of lock bits either in the main memory or in the cache are avoided by storing a plurality of lock bits within the SCU itself. More specifically, the SCU is provided with a lock directory defined so that each memory address associated with a memory access request being processed and synchronized is mapped to a location in the lock directory in such a way that addresses in the same block of memory are mapped to the same location.

The synchronizing scheme of this invention operates by interlocking, as a unit, blocks of memory containing designated memory locations. The SCU, accordingly, for purposes of lock management, need not be concerned with memory addresses of a granularity finer that of the cache block. In essence, an incoming memory access request which requires a lock on a given memory location is processed by first interrogating the corresponding lock bit in the SCU lock directory. This is performed by using the memory address associated with the request as an index into the lock directory defined in the SCU. If the lock bit is not set, the lock request is granted. The lock bit is subsequently set and maintained in that state until the memory access operation accompanying the lock request is completed and generates an 'unlock' request indicating that the memory address at issue, and, hence, the cache block containing the address, may then be made available for subsequent lock requests. The memory address to which an unlock request is directed is used as an index into the SCU lock directory, and the corresponding lock bit is cleared.

However, if the lock bit corresponding to the memory address on which an interlock is requested is found to be set on interrogation, the lock request is denied and the requesting system unit is notified of the denial and requested to try back again. Because denied lock requests are returned to the requesting system unit and are treated as having been otherwise processed by the synchronizing scheme, a requesting unit is not forced to wait in a deadlocked state for a particular cache block to be unlocked before the unit's memory access request is honored.

According to another aspect of this invention, fairness in the processing of memory access requests is insured by the provision of a reserve list onto which a lock request may be placed after it has been denied. Any time a lock request from a particular port is denied, it is positioned on the reserve list provided it has not already been so placed, and provided there is an available slot on the reserve list. When the lock bit corresponding to the requested cache block is subsequently unlocked, the request which is found to be at the top of the reserve list at the time is granted, while the remaining requests in the list are all shifted upward in the list by one slot. This guarantees a predefined degree of fairness in the processing of denied lock requests and the extent to which fairness is extended corresponds of course to the depth of the reserve list.

The above arrangement works efficiently for both CPUs and I/O units because lock bits are kept in a separate directory in the SCU. It is not necessary that the memory block to which an access request is addressed be located in any particular cache and, thus, lock requests from I/O units, which typically have no indigenous cache of their own, can also be synchronized without difficulty.

BRIEF DESCRIPTION OF THE DRAWINGS

Additional objects and advantages of the invention will become apparent upon reading the following detailed description and upon reference to the drawings in which.

DESCRIPTION OF THE PREFERRED EMBODIMENTS

Figure 1:
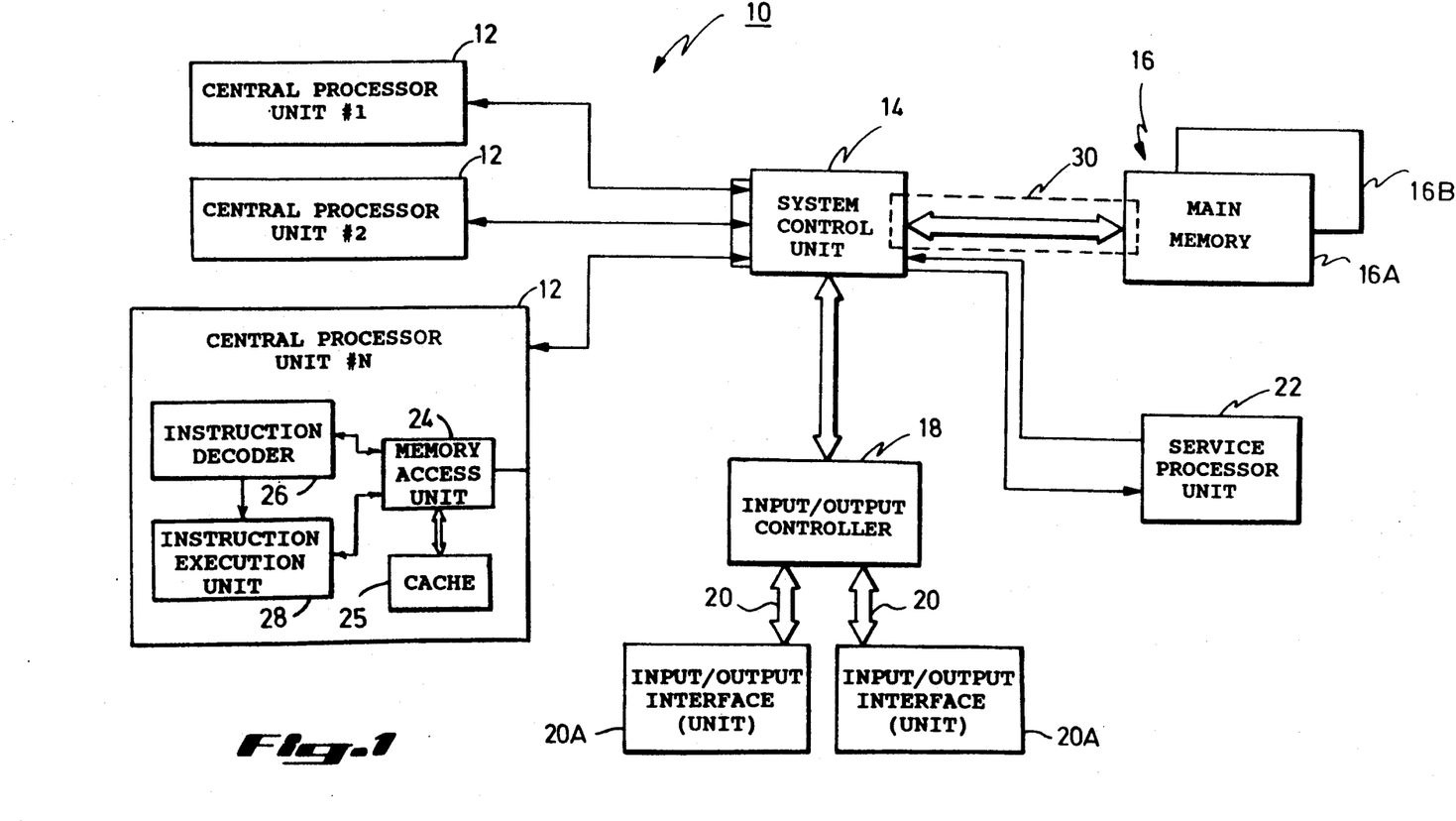
FIG. 1 is a block diagram illustrating a multi-processor computer system using a system control unit (SCU) for operating a plurality of central processor units (CPUs) and input/output (I/O) units in which the lock request processing and synchronizing scheme of this invention may be effectively used.

Turning now to the drawings and referring in particular to FIG. 1, there is shown a block diagram of a multi-processing system 10 which uses a plurality of central processing units (CPUs) 12 and is adapted to permit simultaneous, i.e., parallel, operation of the system CPUs by allowing them to share a common memory 16 for the system. Each CPU 12 includes a memory access unit 24, a cache 25, an instruction decoder 26, and an instruction execution unit 28. The main memory 16 itself typically comprises a plurality of memory units 16A and 16B. A system control unit (SCU) 14 links the CPUs 12 to the main memory 16 and to an input/output (I/O) controller 18. The I/O controller allows the processing system in general and the CPUs in particular to communicate with the external world through appropriate I/O interfaces 20 and associated I/O units 20A for the system. The SCU 14 may also link the various system modules to a service processor/console unit (SPU) 22 which regulates traditional console functions including status determination and control of the overall operation of the processing system.

In the multi-processing system of FIG. 1, efficient communication between system units linked through the SCU 14 and the main memory 16 and, more particularly, between each system CPU 12 and the individually addressable segments comprising each memory unit 16A, 16B is handled through dedicated interface means 30. The specific configuration of the main memory and the particular manner in which the SCU is interfaced to the memory is not important to the present invention and accordingly will not be discussed in detail herein Reference is hereby made to the above referenced co-pending Gagliardo et al. U.S patent application Ser. No. 07/306,326 filed Feb. 3, 1989, abandoned, continued in Ser. No. 07/646,522 filed Jan. 28, 1991, titled "Method And Means For Interfacing A System Control Unit For A Multi-processor System With The System Main Memory", also owned by the assignee of the present invention, incorporated herein by reference for details on preferred interface means. For purposes of describing the present invention, it suffices to state that each memory unit 16A, 16B of the main memory 16 is preferably split between two memory ports on the SCU with each port being linked to two individually addressable segments and all segments being interleaved on block boundaries, as described in detail in the aforementioned co-pending application.

Each system unit, such as a CPU or an I/O unit, is ported into the SCU 14 through a discrete port and all communication requests to and from memory and, more specifically, access requests between memory and the system units, are lodged at the corresponding port on the SCU. The SCU 14 functions to keep system units active while avoiding inter-unit conflicts by handling requests for communications between the system unit and the system memory that are received at various ports on the SCU. Because the various CPUs and I/O units are operated in a parallel fashion within the multi-processing system, a plurality of communication requests are routinely received at the SCU. In addition, a number of such requests may typically require access to the same system resources in order to honor the requests by executing the commands associated herewith It is, accordingly, an important function of the SCU to process requests received at its ports from the system units in a fashion that utilizes the system resources in the most efficient manner and, in addition, treats each arriving system request in a fair manner by processing the request within a reasonable period of time.

This function may be performed by use of some form of arbitration technique for deciding the selection and order of execution of incoming requests An exemplary arbitration technique particularly suited for use with high-performance multiprocessor systems is disclosed in the above-referenced co-pending Flynn et al. U.S. patent application Ser. No. 07/306/871, filed Feb. 3, 1989, titled Method And Means For Arbitrating Communication Requests Using A System Control Unit In A Multi-Processor System, also owned by the assignee of the present invention, and incorporated herein by reference for details on preferred arbitration means It will be obvious that the communication requests received and arbitrated by the SCU include requests from system units, including CPUs and I/O units, to access main memory for read/write operations. Further, these memory access requests may include requests for 'locked' access to memory. The SCU initially proceeds with arbitrating such requests, preferably in accordance with the above-referenced arbitration scheme, to determine at any given time, the particular request to be processed which has all resources required by it available. Assuming that the selected request is a locked memory access request from a system unit, it then becomes the responsibility of the SCU to determine whether or not the requested lock on the memory location being addressed by the selected request should be granted. In other words, at this stage, the SCU needs to synchronize and process lock requests generated by two or more of the system units in connection with various cooperating processes, in such a way as to achieve the desired objectives of fairness, deadlock prevention, and optimum processing speed.

In accordance with this invention, the processing and synchronizing of look requests for access to memory is handled by the SCU itself. Synchronizing is performed on the basis of a locking granularity which is substantially less than that of the overall memory system. Since the SCU essentially regulates the interfacing of communication requests between system units and the system memory, it is advantageous to use the SCU for monitoring and controlling all lock requests. Further, in a system of the type illustrated in FIG. 1 locking granularity is defined at the level of individual cache blocks for the system CPUs. Since the cache block represents the unit of memory allocation in the multi-processing system described above, defining locking granularity at the cache block level conveniently allows the SCU to check the locked or unlock status of a memory block without undue delay.

According to another important aspect of this invention, the SCU is provided with a lock directory comprising a plurality of lock bits which are defined in such a way that memory addresses associated with memory access requests being processed are mapped to a particular location in the lock directory. Further, the mapping is done in such a manner that addresses defined within the same block of memory are mapped to identical locations within the lock directory. The lock directory therefore provides a central memory means for storing a directory of lock bits corresponding to respective blocks of addressable storage locations, the state of each of said lock bits indicating whether or not the corresponding block of addressable storage locations is locked. The lock directory is defined as an integral part of the central "Tag" directory used within the multi-processing systems to keep track of the status of caches within individual processors. Such a central directory or tag storage includes a location corresponding to every block of memory stored within a CPU cache. Each such location includes bits which define the nature (valid, invalid, read, write) of data stored in the block. Defining the lock directory as being part of the tag directory avoids the need for additional storage which would otherwise be required to maintain the lock directory. Instead, the RAMs used for defining the cache tag directory can also be used to define and maintain the lock directory. More specifically, a single lock bit is provided for each entry in the SCU tag directory and a list of reserve bits is also implemented therein and maintained on the basis of sequential reserve of denied lock requests up to the maximum number of reserve bits defined on the list, as will be described in detail below.

In the case of lock requests, the "low" segment of the memory access address accompanying a lock request is used as an index into the lock directory to generate an output signal indicating whether or not the address location is locked. Each lock bit location corresponds directly to the tag referencing the same block within a CPU cache. Such a cache stores a segment of main memory and by using only the "low" segment of the memory access address, blocks of memory which are far enough apart in the main memory share the same location in the lock directory. For instance, in the illustrative embodiment of FIG. 1, a cache block is defined to be 64-bytes wide. Accordingly, if a thousand lock bits are used to define the main memory of the system, blocks which are sufficiently apart, i.e., which are apart by a factor of $64 \times 1000 = 64K$ bytes share the same location within the tag directory. Hence, two memory blocks which have the identical "low" address segments will show up as being blocked even if only one is actually locked. This arrangement has been found to provide an efficient compromise between the extreme choices of defining either a single lock bit for the whole memory or a single lock bit for every memory location.

Figure 2:
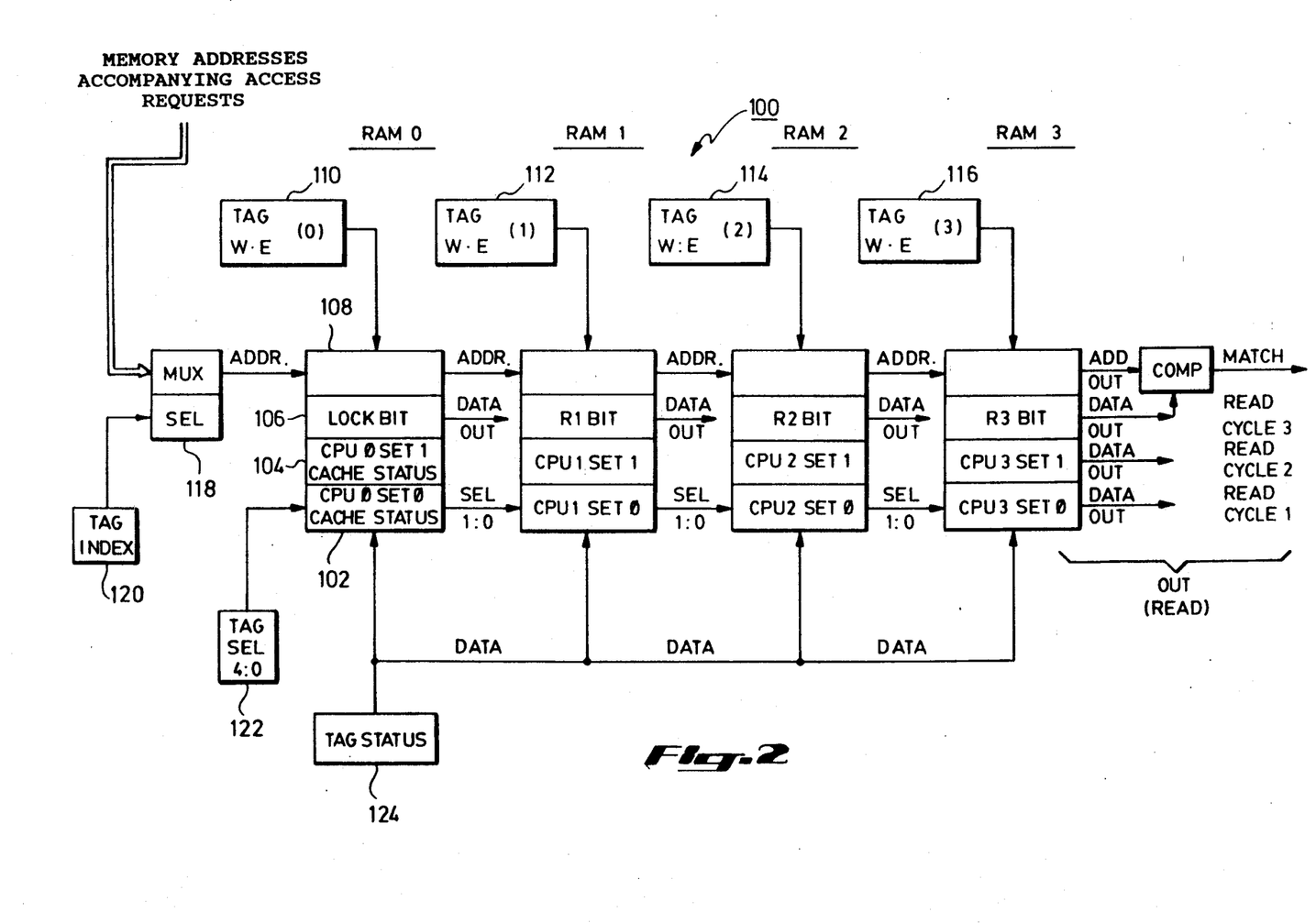
FIG. 2 is a diagram illustrating the manner in which the cache status or tag directory within the SCU is used to define the lock bit and the reserve list.

An illustrative arrangement for defining the lock directory within the tag directory of the SCU is shown in FIG. 2 which illustrates the manner in which the representative structure of a global tag directory for maintaining CPU cache status is adapted to have defined therein designated segments for storing the lock bits as well as the reserve bits which define the reserve list. Thus, all lock bits are stored within the same RAMs where the status of the CPU caches is normally stored. As shown in FIG. 2, the global tag structure 100 includes four (4) separate RAM structures designated as RAM 0, RAM 1, RAM 2, and RAM 3 which correspond to the caches in the corresponding CPUs CPU 0, CPU 1, CPU 2, and CPU 3. Each RAM is dedicated to one CPU and, according to a preferred implementation, has a capacity of four kilobytes (4K) so that four separate 1—K sections may be defined. The first section 102 holds the Set 0 status for the CPU while the second section 104 holds the Set 1 status. According to a preferred embodiment of this invention, the third section 106 is used to define the lock bits. The fourth section 108 is left unused and can be used to advantage if the locking granularity is required to be further reduced by the addition of more lock bits.

Write-Enable (W.E.) lines 110, 112, 114, and 116 are provided for enabling the writing of tags corresponding to the four RAM structures RAM 0-3. Memory addresses accompanying access requests are directed through a multiplexer arrangement 118 which has its 'select' input enabled by the tag index 120 to pick out the memory address for which the cache status is required. A tag 'select' signal 122 is used to pick between the cache status for Sets 0 and 1, respectively, of a particular CPU. In particular, two bits of this tag select signal provide a select signal (SEL 1:0) that selects either the RAM structure 102 or the RAM structure 104. In FIG. 2, only one set of RAMs are shown for each RAM structure. In actuality, a plurality of RAMs are typically provided for each RAM structure. In the illustrative embodiment of FIG. 1, for instance, six RAMs are provided for each RAM group. A 3-bit tag 'status' input 124 is also provided to each of the RAM structures and the cache status is sequentially read out in consecutive read cycles as output data while the corresponding memory addresses are also generated at the output. These addresses pass through a comparison unit to determine if there is a match between the memory address corresponding to a memory access request and the contents of the corresponding cache block.

It is significant that the global tag structure described above is particularly adapted to the maintenance and read-out of the status of cache blocks within individual CPUs. Typically, the cache status indicates whether a particular cache block contains data which is either invalid, read, written partial, or written full. The use of segments of the same RAMs which are used to define the cache status tag directory for storing the lock bits is advantageous in that exactly the same hardware used for maintaining and updating the cache status of the CPUs can be used for maintaining and updating the lock directory. As a matter of fact, the global tag structure shown at FIG. 2 is identical to the tag structure otherwise used by the SCU for maintaining the status of individual CPU caches. Reference is hereby made to co-pending Flynn et al. U.S. patent application Ser. No. 07/306,776, filed Feb. 3, 1989, abandoned, continued in Ser. No. 07/727,296 filed Jul. 9, 1991, for "Scheme For Insuring Data Consistency Between A Plurality Of Cache Memories And The Main Memory In A Multi-Processor Computer System", also owned by the assignee of the present invention, wherein details are provided as to the structural nature of the CPU caches and the manner in which the cache tags may be used to specify the status of individual CPU caches. The disclosure in the aforementioned application is incorporated herein by reference.

It should be noted in FIG. 2 that the lock bits are provided only in the first RAM structure and, accordingly, the lock directory includes a separate lock bit for each of the system units. The corresponding bits in the remaining three RAM structures RAM 1, RAM 2, and RAM 3 are respectively designated as reserve bits R1, R2, and R3 for each of the system units. The allocation of reserve bits and the manner in which they are updated as lock requests are denied will be described in detail below.

Figure 3:
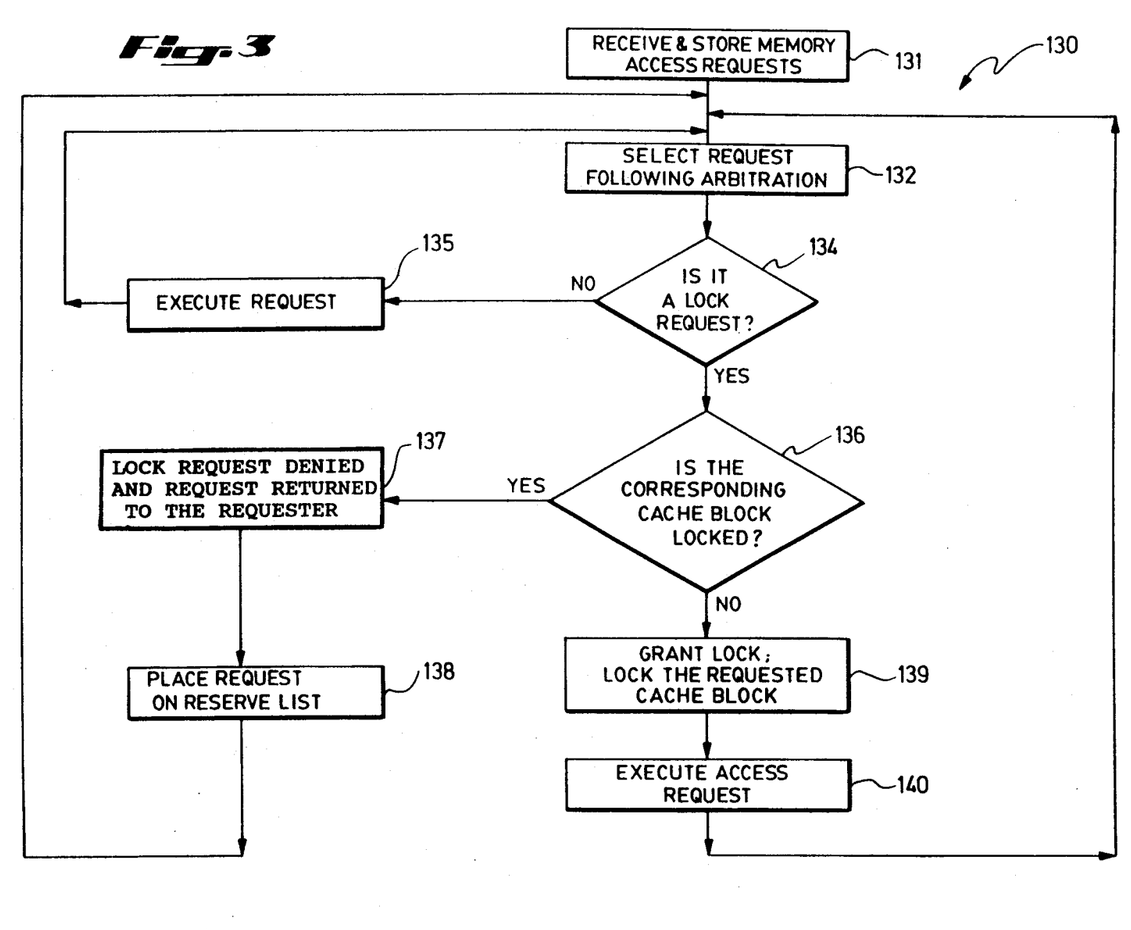
FIG. 3 is a flowchart illustrating the basic sequential procedure on which the synchronizing scheme of this invention is used.

Referring now to FIG. 3, there is shown an upper level flowchart defining the basic procedure involved in implementing the lock request processing and synchronizing scheme of this invention. As shown therein, the overall procedure 130 is initiated at step 131 where memory access requests are received and stored. At step 132, the stored requests are arbitrated in order to select a particular request for execution. Arbitration is performed on the basis of availability of resources required to execute a request while, at the same time, insuring that a request that has been waiting the longest for corresponding resources to become available is given the highest priority, as described in detail in the above-referenced Flynn et al. patent application entitled "Method And Means For Arbitrating Communication Requests Using A System Control Unit In A Multi-Processor System". Subsequently, at step 134, a command field accompanying the memory access request is inspected to determine whether or not the request is a "lock" request. If the answer at step 134 is no, step 135 is accessed where the request at issue is executed in the normal fashion and step 132 is accessed again to proceed with the selection of the subsequent request.

However, if it is found at step 134 that the request is indeed of the lock type, a determination is made at step 136 as to whether or not the cache block corresponding to the memory access request has previously been locked by a request from another system unit or port. If the answer at step 136 is yes, step 137 is accessed where the lock request is denied and the request is returned to the requesting port.

Subsequently, at step 138, the denied request is placed on a reserve list prior to returning to step 132 for arbitration of other outstanding requests. The specific procedure involved in developing a reserve list will be discussed below in detail. If the answer at step 136 is found to be in the negative, i.e., the corresponding cache block is not locked, the lock request is granted at step 139 and the addressed cache block is set to a locked status. Subsequently, at step 140 the granted memory request is executed before returning to step 132 for a selection of another access request for execution.

Figure 4:
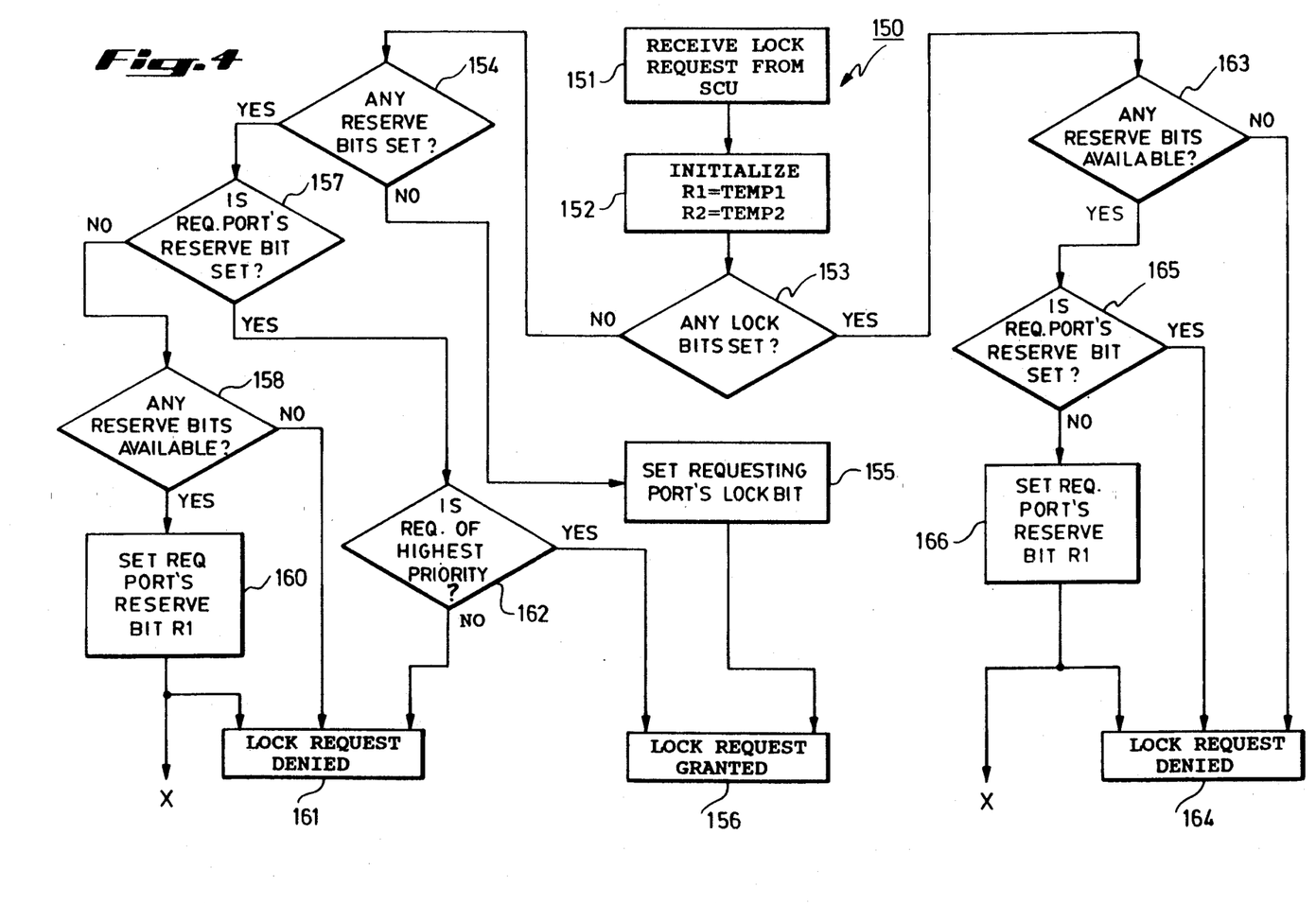
FIG. 4 is a more detailed flowchart illustrating the sequential procedure according to which lock requests are processed by either being granted or denied on the basis of the status of the lock directory, and subsequently placed on reserve.

Referring now to FIG. 4, there is shown a lower level flow chart illustrating in detail the procedure involved in determining whether a lock request being processed is to be granted, denied, or placed on the reserve list. The detailed sequence 150 is initiated at step 151 by the receipt of a lock request from the SCU. At step 152, bits R1 and R2 of the reserve list are initialize by assigning values equal to Temp 1, and Temp 2, respectively. In FIG. 2, for instance, the reserve list is shown as having a depth of three (3) bits, as represented by the RAM areas marked as R1, R2, and R3 in RAM structures RAM1, RAM2, and RAM3, respectively. Returning to FIG. 4, the reservation of denied requests in the 3-bit reserve list will now be further described. At step 153, a check is made to see if any of the lock bits corresponding to the system units (as represented by the lock bit in the RAM structure RAM 0 in FIG. 2) as set. If none of the lock bits are found to be set, step 154 is accessed where a check is made to see if any of the reserve bits (R1, R2, and R3 in FIG. 2) are set. If none of the reserve bits are found to have been set, the lock bit corresponding to the requesting port is set at step 155 and the lock request is granted at step 156. If any of the reserve bits are found to have been set at step 154, step 157 is normally accessed where a determination is made as to whether or not the reserve bit corresponding to the requesting port, i.e., the port originating the lock request, is set. If the answer is no, a check is made at step 158 to see if any of the reserve bits in the reserve list or queue are available. A negative answer at step 158 leads to the denial of the requested lock at step 161. If a reserve bit is in fact found to be available, step 160 is accessed where the reserve bit corresponding to the requesting port and having the lowest reserve priority (R1) is set. Subsequently, step 161 is reached where a shift routine is employed for updating the reserve list, as will be explained below.

If it is found at step 157 that the reserve bit for the requesting port has already been set, a check is made at step 162 to determine if the requesting port has been reserved with the highest available reserve priority. If the answer at step 162 is found to be negative, i.e., there exists at the time an outstanding lock request having a higher priority, the current lock request is denied at step 161. If the answer at sep 162 is found to be affirmative, i.e., the requesting port has been reserved with the highest available priority, then the current lock request is granted at step 156. Therefore, execution of the sequence of steps 153, 154, 157 and 162 provide a means for inspecting the reserve list when a lock bit indicates that a block of addressable storage locations becomes unlocked and granting the oldest denied memory access request in the reserve list that requests access to the unlocked block of addressable storage locations.

If the answer to step 153 is affirmative, i.e., at least one of the lock bits is found to have been set, a check is made at step 163 to see if any of the reserve bits are available. If no reserve bits are available, the lock request is denied at step 164. However, if the answer at step 163 is yes, step 165 is accessed where a check is made to see if the requesting port has its reserve bit set.

If the answer is yes, the corresponding lock request is denied at step 164. If the reserve bit for the requesting port is not set, the reserve bit for that port is set to the lowest reserve priority at step 166 and, subsequently, step 164 is accessed and the lock request is denied. At the same time, the procedure for updating the reserve list is employed.

Figure 5:
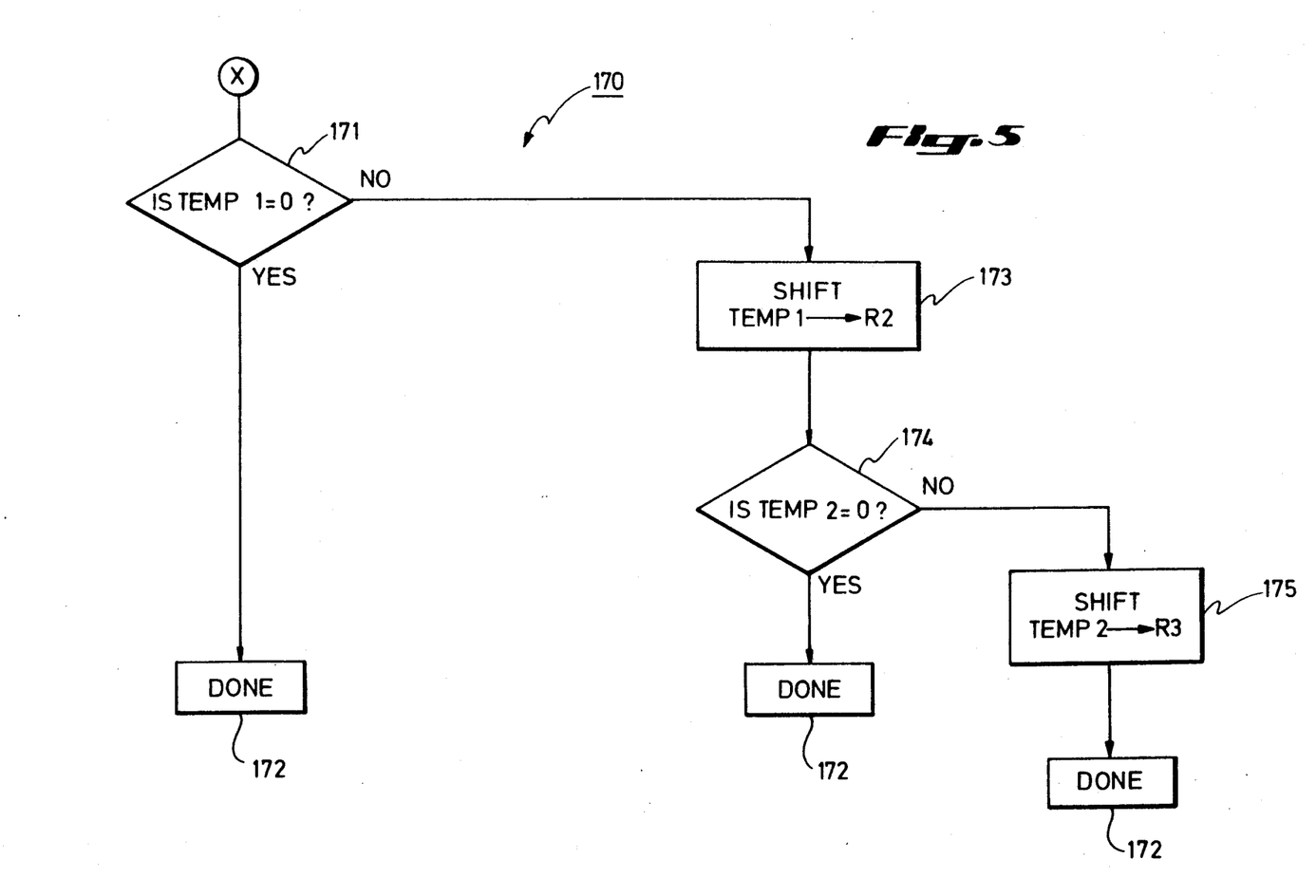
FIG. 5 is a flowchart illustrating the manner in which the reserve list is maintained for use with the procedure outlined in FIG. 3.

Turning now to FIG. 5, there is shown a flow chart illustrating the procedure involved in updating the reserve list. As evident from the above discussion, the procedure X (designated generally as 170) is accessed anytime that a requesting port's reserve bit is to be set. At step 171, the initial value Temp 1 assigned to reserve bit R1 is tested to see if it is equal to 0. If the answer is yes, it is an indication that no other entries have previously been made in the reserve list and, accordingly, merely setting the reserve bit having the lowest priority, i.e., R1, for the requesting port is sufficient and the updating procedure comes to a halt at step 172.

However, if the answer at step 171 reveals that Temp 1 has a value not equal to 0, it is an indication that one or more requests have been placed on reserve on the reserve list. Subsequently, step 173 is accessed where the value Temp 1 in reserve bit R1 is shifted into the reserve bit R2. At step 174 the value Temp 2 initially loaded into the reserve bit R2 is tested to see if it is equal to 0. An affirmative answer at Step 174 again leads to the completion of the updating procedure at step 172. If the value Temp 2 is not equal to 0, step 175 is accessed where the value Temp 2 is shifted into the reserve bit R3 and, subsequently, the updating is completed. The above procedure insures that memory requests are placed on the reserve list in sequential order so that each time a new request is added to the list, the priority of previously reserved requests is increased by one level. Thus, the oldest outstanding request on reserve is always arbitrated for grant of a lock request.

According to a further aspect of this invention, the illustrative scheme described above with reference to FIGS. 3-5 may conveniently be adapted to provide means for overriding the reserve priority defined by the sequential storage of denied lock requests on the reserve list if needed to insure that a requesting CPU is not kept waiting on the reserve list for an extended period of time. Despite the fairness built into the scheme described above, it is possible for a requesting unit to remain unserviced as it moves upward along the reserve list; this is particularly of concern with certain lock requests from I/O units, which can take a prolonged period of time for servicing memory access requests once an associated lock has been granted. Hence, it is possible for a reserved CPU port to "time out" or crash if its built-in maximum period of waiting expires while the CPU is on the reserve list. Under these conditions, the lock request synchronizing scheme can be adapted to set up a flag while the reserve list is being updated, indicating that a requesting port is to be bumped up to the top of the reserve list provided certain predefined conditions exist.

Figure 6:
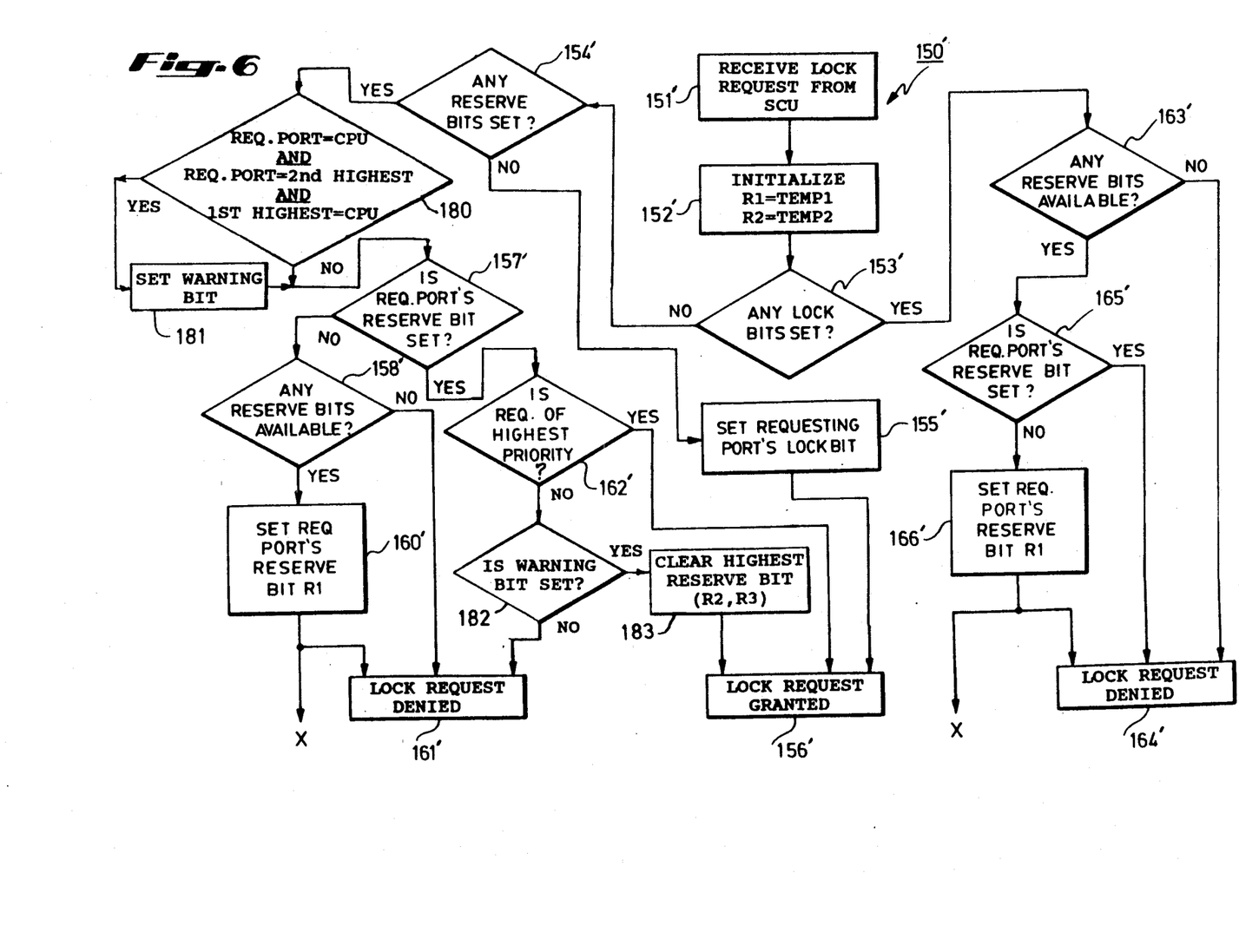
FIG. 6 is an alternative arrangement of the sequential procedure of FIG. 4 in which additional steps are included for selectively overriding the reserve priority of the lock requests placed on reserve.

Turning now to FIG. 6, there is shown an alternative arrangement of the sequential procedure of FIG. 4 in which additional steps (180, 181, 182, 183) have been included for selectively overriding the reserve priority of the lock requests placed on reserve. In FIG. 6, the steps that are similar to the steps in FIG. 4 are designated with similar but primed reference numerals. In FIG. 6, for instance, if the test at step 154' indicates that at least one reserve bit has been set, then a test is made at step 180 to see if (1) the requesting port is a CPU, (2) the port has the second highest reserve priority, and (3) the port having the highest priority at the time is a CPU. These conditions are defined on the basis that a newly reserved port is not to be bumped up to a higher priority and an I/O port having the outstanding highest priority is not to be displaced therefrom. If these conditions are satisfied, step 181 is accessed where a warning bit is set before returning to step 157'. Subsequently, if it is found at step 162' that the requesting port does not have the highest priority routine, then at step 182, a check is made to see if the warning bit is set. If the answer is yes, it is an indication that the requesting port may be close to "crashing" and, hence, the reserve priority of the port is instantaneously bumped up (at step 183) and the requested lock is granted after clearing the highest reserve list. If step 182 reveals that no warning bit has been set, then the lock is denied at step 161'. It will be obvious that the alternative prod of FIG. 6 need not be executed instead of the procedure of FIG. 4 if there is no reason to monitor the possibility of a CPU timing out.

We claim:

1. A method of processing locked memory access requests in a multi-processor system having a system control unit (SCU) for operating a plurality of central processor units (CPUs) in a parallel fashion in combination with at least one input/output (I/O) unit, wherein each of said CPUs and I/O unit is ported into the SCU, the SCU being operative to controllably allow said CPUs and said I/O unit to access addressed ones of a multiplicity of segments of a system memory, said method processing, in an efficient and fair manner, locked memory access requests received at the SCU ports from one or more of said CPUs and said I/O unit, and comprising:

storing within said SCU a directory of lock bits, each of said lock bits corresponding to a predefined segment of memory locations in said system memory, the status of each of said lock bits, set or not set, representing whether or not the corresponding memory segment is locked;

ascertaining, for each locked memory access request from a requesting one of said units, whether or not the lock bit corresponding to the memory segment containing the memory location being addressed by each locked memory access request is set; and either granting each locked memory access request to said requesting unit when said corresponding lock bit is found not to be set, or denying each locked memory access request to said requesting unit when said corresponding lock bit is found to be set, and wherein locked memory access requests that are denied because the memory location addressed by each locked memory access request corresponds to a locked memory segment are further arbitrated by said SCU by:

storing, on a reserve list for each locked memory segment, a denied locked memory access request to each locked memory segment when (1) the list is not full with prior denied and reserved requests, and (2) the denied request has not already been placed on the list; and granting the oldest denied locked memory access request existing on said reserve list, when each locked memory segment becomes unlocked.

2. The method of processing locked memory access requests as set forth in claim 1 wherein each of said CPUs includes an associated cache memory capable of storing a block of memory containing a fixed number of memory locations, and wherein each of said lock bits in said SCU lock directory corresponds to a respective block of memory defined by said CPU caches, whereby all memory addresses which are associated with a memory access request and which fall within a cache block are mapped to the same lock bit in said SCU directory.

3. The method as set forth in claim 1, further comprising the steps of:
- removing from the reserve list the oldest denied locked memory access request when the oldest denied locked memory access request originated from a first one of said CPUs, the reserve list includes a second oldest denied locked memory access request that originated from a second one of said CPUs, and another locked memory access request is received from said second one of said CPUs; and
- granting said another locked memory access request.

4. In a multi-processor system having a system control unit (SCU) for operating a plurality of central processor units (CPUs) in a parallel fashion in combination with at least one input/output (I/O) unit, wherein each of said CPUs and I/O unit is ported into the SCU, the SCU being operative to controllably allow said CPUs and said I/O unit to access addressed segments of a system memory, the improvement comprising:
- means for storing within said SCU a directory of lock bits, each of said lock bits corresponding to a predefined segment of memory locations in said system memory, the status, set or not set, of each of said lock bits representing whether or not the corresponding memory segment is locked or not;
- means for determining, for each locked memory access request from a requesting one of said units, whether or not the lock bit corresponding to the memory segment containing the memory location being addressed by each locked memory access request is set;
- means for granting each locked memory access request to said requesting unit when said corresponding lock bit is found not to be set; and
- means for denying each locked memory access request to said requesting unit when said corresponding lock bit is found to be set;
- memory means for storing for each of said lock bits a reserve list including a predetermined number of reserve bits for indicating in sequential order denied locked memory access requests that were denied in response to each of said lock bits being found to be set;
- means for storing, in response to each lock bit being found to be set, a denied locked memory access request on said reserve list when (1) the list is not full with prior denied and reserved locked memory access requests, and (2) the denied locked memory access request has not already been placed on the list; and
- means for granting the oldest denied locked memory access request existing on said reserve list, when each lock bit is found not to be set.

5. The improvement as set forth in claim 4, wherein each of said CPUs includes an associated cache memory capable of storing a block of memory containing a fixed number of memory locations, and wherein each of said lock bits in said SCU lock directory corresponds to a respective block of memory defined by said CPU caches, whereby all memory addresses which are associated with a memory access request and which fall within a cache block are mapped to the same lock bit in said SCU directory.

6. The improvement as set forth in claim 4, further comprising means for removing from the reserve list the oldest denied locked memory access request when the oldest denied locked memory access request originated from a first one of said CPUs, the reserve list includes a second oldest denied locked memory access request that originated from a second one of said CPUs, and another locked memory access request is received from said second one of said CPUs, whereby said another locked memory access request becomes granted.

7. A computer system comprising, in combination,
- a main memory unit having addressable storage locations organized into blocks of a predetermined block size;
- a plurality of central processing units (CPUs), each of said central processing units having a cache memory for storing at least one block of data having said predetermined block size;
- means connecting the cache memories of said central processing units to said main memory for transferring blocks of data between said addressable blocks of storage locations in said main memory and said cache memories;
- at least one input/output (I/O) unit connected to said main memory; and
- means, responsive to memory access requests from said central processing units and said input/output unit, for selectively permitting said central processing units and said input/output unit to access addressed ones of said blocks of addressable storage locations in said main memory, wherein said means for selectively permitting includes
  - a central memory means for storing a directory of lock bits, each of said lock bits corresponding to a respective one of said blocks of addressable storage locations, the state of each of said lock bits indicating whether or not the corresponding block of addressable storage locations is locked, and
  - means for accessing the directory of lock bits to determine, for each of said memory access requests, whether or not the corresponding block of addressable storage locations is locked, and granting the memory access request when the corresponding block of addressable storage locations is not locked, and denying the memory access request when the block of addressable storage locations is locked,
  - wherein said means for selectively permitting further includes means for storing, for each of said lock bits, a reserve list of memory access requests that are denied in response to each of said lock bits indicating that a corresponding block of addressable storage locations is locked, and means for inspecting said reserve list when each of said lock bits indicates that a block of addressable storage locations becomes unlocked and granting the oldest denied memory access request in said reserve list that requests access to the unlocked block of addressable storage locations.

8. The computer system as set forth in claim 7, further comprising means for removing from the reserve list the oldest denied memory access request when the oldest denied memory access request originated from a first one of said CPUs, the reserve list includes a second oldest denied memory access request that originated from a second one of said CPUs, and another memory access request is received from said second one of said CPUs, whereby said another memory access request becomes granted.

* * * * *